US009123190B2

(12) United States Patent
Pawlik et al.

(10) Patent No.: US 9,123,190 B2
(45) Date of Patent: Sep. 1, 2015

(54) METHOD FOR AUTHENTICATING AN OBJECT

(71) Applicants: Thomas D. Pawlik, Rochester, NY (US); Judith A. Bose, Webster, NY (US); Ronald S. Cok, Rochester, NY (US); Nelson A. Blish, Rochester, NY (US)

(72) Inventors: Thomas D. Pawlik, Rochester, NY (US); Judith A. Bose, Webster, NY (US); Ronald S. Cok, Rochester, NY (US); Nelson A. Blish, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 380 days.

(21) Appl. No.: 13/755,296

(22) Filed: Jan. 31, 2013

(65) Prior Publication Data

US 2014/0210998 A1 Jul. 31, 2014

(51) Int. Cl.
*H04N 7/18* (2006.01)
*G07D 7/12* (2006.01)

(52) U.S. Cl.
CPC .......................................... *G07D 7/12* (2013.01)

(58) Field of Classification Search
USPC ............. 348/135, 131, 137, 146, 167, 49, 50, 348/57, 58, 64, 68, 230.1, 236, 237, 238, 348/335, 370, 371, 552; 235/426.24, 454, 235/462.01, 462.42, 468; 340/5.8, 5.86, 340/321, 397.5, 539.22, 549, 815.75, 340/825.34, 956, 982
See application file for complete search history.

(56) References Cited

U.S. PATENT DOCUMENTS

| | | | | |
|---|---|---|---|---|
| 7,675,684 | B1 * | 3/2010 | Weissman et al. | 359/630 |
| 2005/0067494 | A1 * | 3/2005 | Ito et al. | 235/454 |
| 2006/0159454 | A1 * | 7/2006 | Bjornstad | 398/51 |
| 2006/0231625 | A1 * | 10/2006 | Cumming et al. | 235/454 |
| 2007/0008471 | A1 * | 1/2007 | Wang et al. | 349/117 |
| 2007/0210164 | A1 * | 9/2007 | Conlon et al. | 235/462.01 |
| 2008/0273117 | A1 * | 11/2008 | Nilsson | 348/552 |
| 2010/0165180 | A1 * | 7/2010 | Park et al. | 348/371 |

* cited by examiner

*Primary Examiner* — Jefferey Harold
*Assistant Examiner* — Mustafizur Rahman
(74) *Attorney, Agent, or Firm* — Nelson Adrian Blish

(57) ABSTRACT

A method for authenticating an object that includes providing a label (12) with invisible indicia (14) printed with optically active material on a reflective substrate; providing a device that has a digital camera (18) having a light source (20), an image sensor (22), a first polarizing filter (24) having a first orientation, and a second polarizing filter (26) having a second orientation; illuminating the label with the light from the light source through the first polarizing filter; forming an image with the image sensor using reflected light from the label wherein the reflected light passes through the second polarizing filter prior to reaching the sensor; wherein the second polarizing filter makes the invisible indicia visible; and authenticating the object.

26 Claims, 7 Drawing Sheets

METHOD FOR AUTHENTICATING AN OBJECT

CROSS REFERENCE TO RELATED APPLICATIONS

Reference is made to commonly-assigned U.S. patent application Ser. No. 13/755,329 (now U.S. Publication No. 2014/0211071), filed Jan. 31, 2013, entitled CELL PHONE AUTHENTICATION DEVICE, by Pawlik et al.; the disclosure of which is incorporated herein.

FIELD OF THE INVENTION

This invention relates in general to authentication of objects and in particular to authentication of objects using a cell phone.

BACKGROUND OF THE INVENTION

Invisible indicia printed with an optically active material on a reflective substrate can be used as a covert security feature on products and product packaging. The product is authenticated by revealing the invisible indicia with the use of a circular polarizing filter. The circular polarizing filter is held in close proximity to the printing. The person holding the filter can then authenticate the item by visually verifying the image or human-readable text or code that is revealed as expected. While this can be an effective security feature, the authentication process has limitations.

When authenticating product out in the field, it is often the case that many items need to be authenticated sequentially, and the results of the authentication audit need to be transmitted to another location. It is therefore useful to be able to automate the method for recording and storing the results and to have a convenient means of transmitting the results once collected.

It is sometimes desirable to have an immediate response to a positive or negative authentication audit. It is therefore useful to have a system that can not only transmit the results of an authentication audit, but also then receive a response back.

It is also often desirable to encode a large amount of data in invisible indicia, for example an item-level serialized number. To reduce the amount of space required to print the data or to speed up reading the printed information, it can be printed in the form of a machine readable code rather than a human-readable code, for example a linear or 2-dimensional bar code. It is therefore useful to be able to quickly and conveniently decode a revealed machine-readable code to be able to quickly authenticate the item.

Finally, at times, it is very desirable for investigators to perform their audits in a covert manner, often without handling the item to be authenticated. It is therefore useful to be able to authenticate an item from some distance away and not to require the revealing device be in close proximity.

SUMMARY OF THE INVENTION

Briefly, according to one aspect of the present invention a method for authenticating an object that includes providing a label with invisible indicia printed with optically active material on a reflective substrate; providing a device that has a digital camera having a light source, an image sensor, a first polarizing filter having a first orientation, and a second polarizing filter having a second orientation; illuminating the label with the light from the light source through the first polarizing filter; forming an image with the image sensor using reflected light from the label wherein the reflected light passes through the second polarizing filter prior to reaching the sensor; wherein the second polarizing filter makes the invisible indicia visible; and authenticating the object.

In one embodiment, a cellular telephone comprises the digital camera. The first and second polarizing filters are located externally to the cellular telephone, for example in or on a case, and are in front of the flash and the digital camera, respectively. Both filters are linear polarizing filters and are oriented orthogonally to each other. Light from the flash of the digital camera is polarized as it passes through the first linear polarizing filter. When the polarized light strikes a label with invisible indicia printed with optically active materials on a reflective substrate, it will reflect off the invisible indicia with a change in the direction of the polarization. The polarized light that reflects off the background of the label will have no change to its polarization. Thus, the invisible indicia are differentiated from the background.

The orthogonally oriented second linear polarizing filter located over the digital camera will block the unchanged polarized light reflecting from the background making it appear dark on the image sensor of the digital camera, but the polarized light reflecting from the invisible indicia will be only partially blocked and thus will appear bright on the image sensor of the camera. The resulting image can then be analyzed, for example, decoded if it is a linear or two-dimensional bar code, or stored in the memory of the cell phone, or transmitted via the cell phone. Once invisible indicia have been decoded and transmitted via the phone, a response can be received by the phone, for example, further information about the item being authenticated. Additionally, if the investigator is an end-user consumer, the information sent back to the investigator via the phone could be promotional information or a coupon that the investigator can use in connection to the item. If the investigator is associated with the supply chain of the item, the information transmitted could initiate restocking of items or other movement of material in the distribution chain.

In a second embodiment, a cellular telephone is the device with the digital camera. The first and second polarizing filters are located externally to the cellular telephone, for example in or on the case, and are in front of the flash and the digital camera, respectively. Both filters are circular polarizing filters and have identical orientation to each other. The first circular polarizing filter can be created by placing a quarter wave plate after a first linear polarizer. In one example, the axis of the linear polarized filter is positioned at a 45 degree angle from the fast axis of the quarter wave plate to achieve left hand circular polarization. Light from the flash of the digital camera is circularly polarized as it passes through the first circularly polarizing filter.

When the polarized light strikes a label with invisible indicia printed with optically active materials on a reflective substrate, it will reflect off the invisible indicia differently than it will reflect off the background. The polarized light that reflects off the background of the label will be changed to right hand circular polarization. This right hand circular polarized light will be blocked by the second circular polarizing filter, which is oriented identically to the first filter, and will appear dark to the image sensor of the digital camera. The light reflected off the optically active invisible indicia will have its polarization direction changed, but not to right hand circular polarization. Thus, the invisible hidden indicia are differentiated from the background. The identically oriented second circular polarizing filter will only partially block the light reflected off the optically active hidden indicia and thus will appear bright on the image sensor.

The resulting image can then be analyzed, for example, decoded if it is a linear or two-dimensional bar code, or stored in the memory of the cell phone, or transmitted via the cell phone. Once hidden indicia have been decoded and transmitted via the phone, a response can be received by the phone, for example further information about the item being authenticated. Additionally, if the investigator is an end-user consumer, the information sent back to the investigator via the phone could be promotional information or a coupon that the investigator can use in connection to the item. If the investigator is associated with the supply chain of the item, the information transmitted could initiate restocking of items or other movement of material in the distribution chain.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
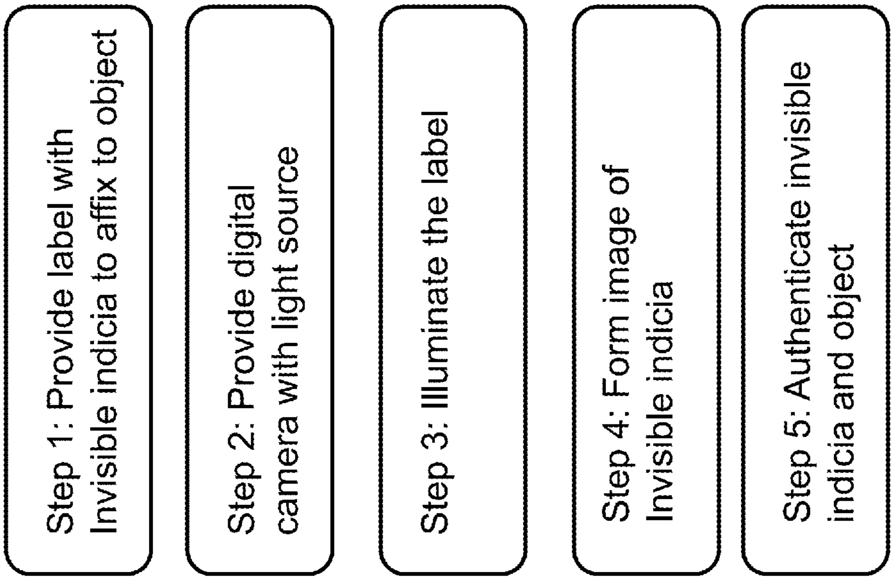
FIG. 1 is a flow diagram of the method of the invention.

Referring now to FIG. 1, it shows a flow chart of the steps involved in the method of the invention. The method involves authentication of an object with an affixed label containing a particular type of invisible indicia using a digital camera with a light source to illuminate the label, forming an image from the invisible indicia, and then authenticating the label, and thus the object.

Figure 2:
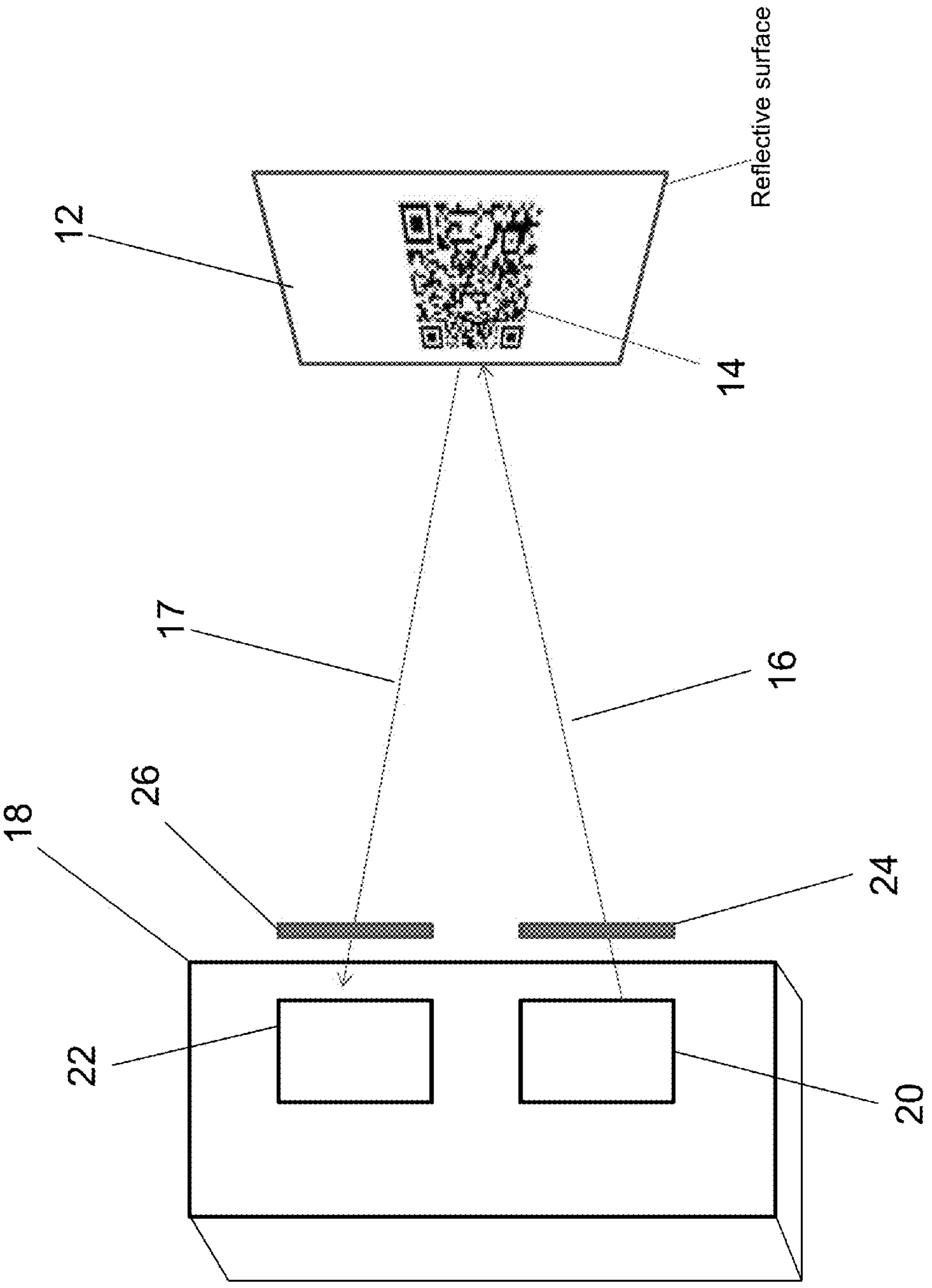
FIG. 2 is a schematic of an authenticating device and item to be authenticated.

Referring now to FIG. 2, it shows a schematic representation of the authentication of a label 12 with invisible indicia 14. The label is constructed from a reflective substrate that preserves the polarization of the incident light, such as a metal. The label is illuminated with a light source 20. The illuminating light passes through a first polarizing filter 24. Light that is reflected from the label 12 passes through a second polarizing filter 26 and reaches an imager 22.

Light source 20 and imager 22 are components of a digital camera 18. The digital camera may be a component of a smart phone or other device. The invisible indicia 14 are deposited onto label 12 in a plurality of regions and are comprised of optically active materials that alter the polarization of light passing through them. Examples of such materials are birefringent polymer layers or chiral molecules.

Figure 3:
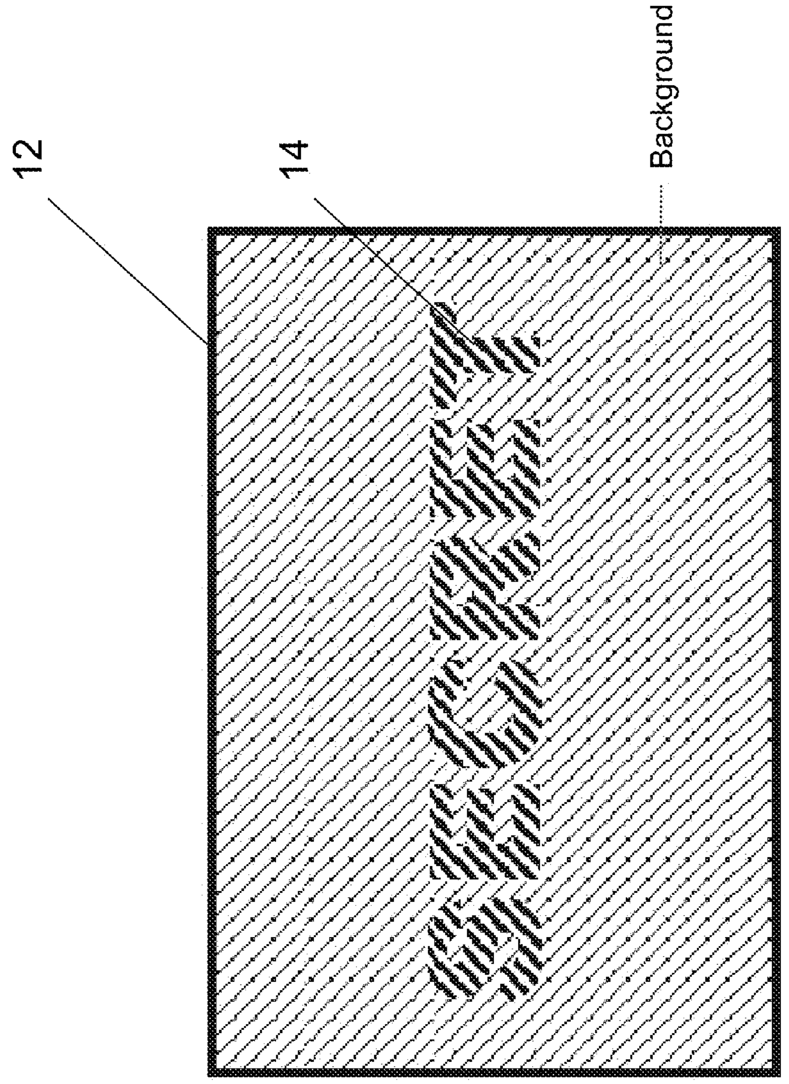
FIG. 3 is a schematic representation of a label with invisible hidden indicia printed with optically active material on a reflective surface.

FIG. 3 shows a graphic representation of the label 12 with invisible indicia 14. The invisible indicia can be human readable, for example alpha-numeric symbols or graphic images, or machine readable, for example linear of two-dimensional bar codes. The invisible indicia can be used to authenticate the label and anything to which the label is affixed. The polarization-altering characteristics of the invisible indicia are different from those of the background; this is represented by two differently shaded areas. To the unaided eye these areas are equally transparent and therefore invisible. The imaging modalities discussed further on convert the different polarization-altering characteristics into different image brightness (indicia versus background), thereby making the invisible indicia visible.

Figure 4:
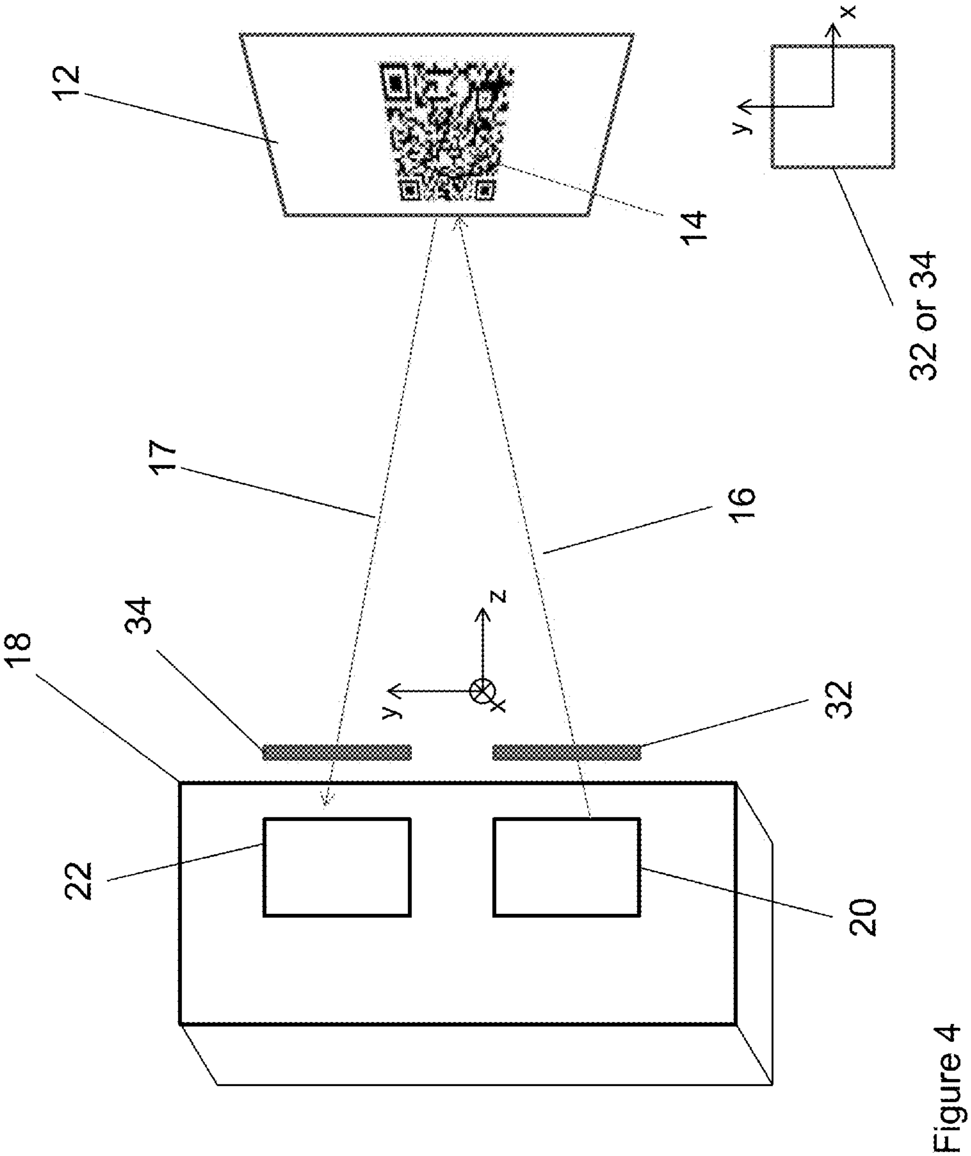
FIG. 4 is a schematic of an authenticating device, where the two polarizing filters are linear polarizing filters, and an item to be authenticated.

FIG. 4 shows an embodiment of the invention where the two polarizing filters 32 and 34 are linear polarizing filters. When linear polarized light 16 created by the combination of light source 20 and first linear polarizer 32 is reflected from the label 12 in the absence of invisible indicia 14, that is from the background, its polarization remains the same, e.g., if the incident light 16 is polarized along the y-direction in FIG. 4, the reflected light 17 will also be polarized along the y-direction. The polarization axis of the second linear polarizer 34 can be oriented along the x direction at a relative angle of 90 degrees with respect to the first linear polarizer 32 such that the reflected light 17 is blocked. Therefore, the label 12 background will appear dark under this type of imaging setup. If invisible indicia 14 are present on label 12, they will change the polarization direction of the reflected light. This will lead to an incomplete blocking of the reflected light by the second polarizer. Therefore, the invisible indicia will appear bright against a dark background. Alternatively, both linear polarizing filters can be oriented with their polarization axes parallel to each other. In this case the label 12 in the absence of invisible indicia, i.e. the background, appears bright and any polarization-modifying indicia will appear dark in the imager 22 of the camera 18.

Either of the above described methods will result in a differentiation of the invisible indicia from the background thus allowing visualization of the hidden indicia by the imager 22. Optimal differentiation of the invisible indicia from the background will occur when the linear polarized filters are oriented orthogonal to each other or in parallel with each other; however, differentiation does also occur at other relative orientations of the first and second linear polarizing filters.

Once detected by the imager 22 of the camera 18, the image can be displayed and viewed by an investigator for authentication purposes; a static image can be verified visually, an alpha-numeric code can read and compared to predefined acceptable codes.

Additionally, the visualized invisible indicia can be further processed if the digital camera has additional features, for example bar code decoding software; is a component of another device, for example a cell phone; or interacts with another device, for example a printer. The invisible indicia can be decoded, if it is a machine-readable code, and displayed in a human-readable form. It can be transmitted via cell phone or other mobile device. It can be printed.

Transmission of the invisible indicia can allow authentication to be done at a remote location. For example, if the invisible indicia are an item-level serial number, the serial number can be transmitted to a remote server containing a database and then cross referenced in the database to either verify the serial number is valid or ascertain additional information associated with that specific item, for example its expected location in the distribution chain. The outcome of the remote authentication step can be transmitted back to the original transmitting device.

Figure 7:
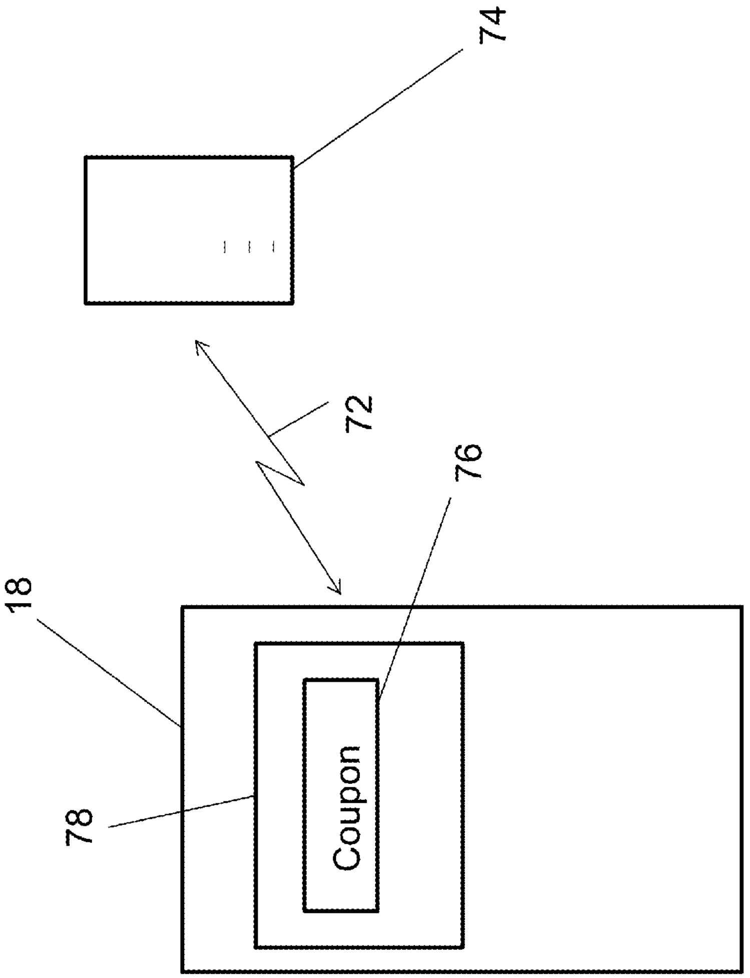
FIG. 7 is a schematic showing the concept of transmitting information to a remote location and receiving a response in the form of a coupon.

Referring now to FIG. 7, digital camera 18 can transmit invisible indicia via a network 72 to a remote server 74 for authentication. The information transmitted back to digital camera 18 via network 72 can be promotional information such as a coupon 76, which can be viewed by a display 78.

Upon remote authentication of an object, additional information about the object, such as information related to the sale of the object, can be transmitted to the remote location. Such information could initiate a response in an inventory management system, for example restocking could occur or reordering could occur.

In addition to transmitting the invisible indicia, a Global Positioning System (GPS) coordinate of the transmitting device can also be transmitted to a remote location allowing for the identification of the location of the object to be authenticated. This also allows for the identification of the location to which reply information, such as a coupon or restocking information, would be transmitted.

Figure 5:
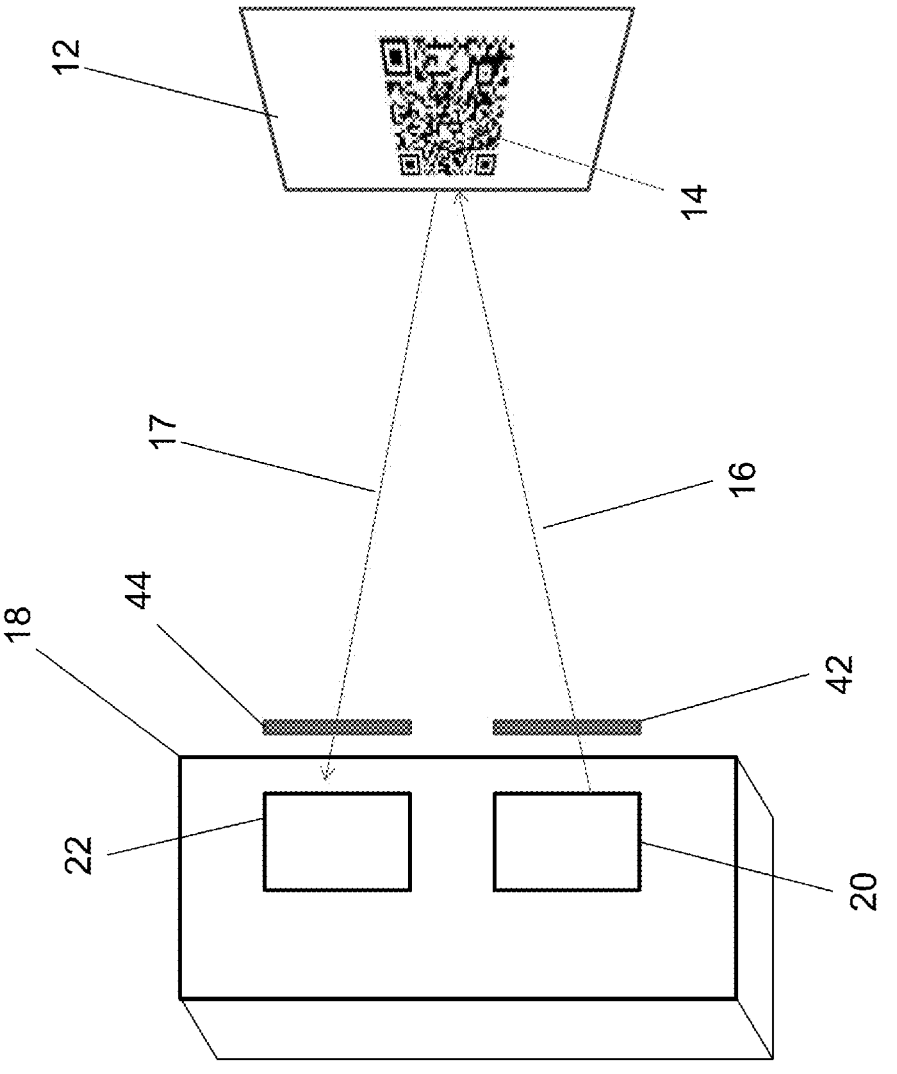
FIG. 5 is a schematic of an authenticating device, where the two polarizing filters are circular polarizing filters, and an item to be authenticated.
Figure 6:
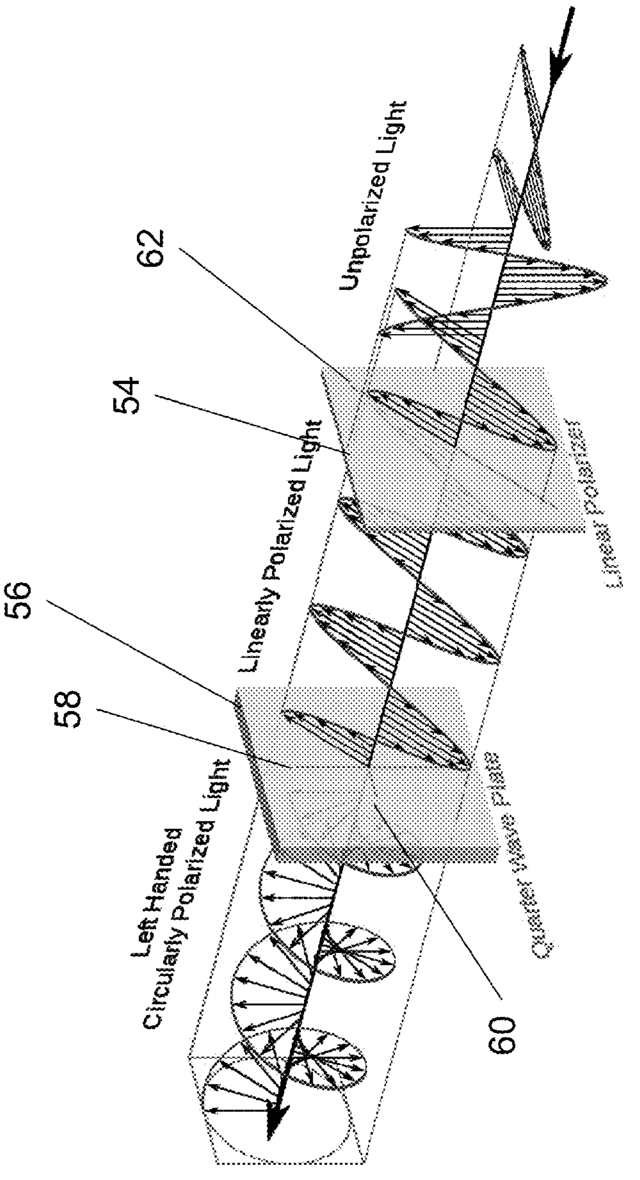
FIG. 6 is a schematic showing in more detail the components of a circular polarizing filter.

FIG. 5 shows an embodiment of the invention where two circular polarizing filters are used as filters 42 and 44. FIG. 6 shows a more detailed schematic of how the circular polarizing filter is commonly constructed. The key components are a linear polarizing filter 54 and a birefringent material forming a quarter wave plate 56. The axis of the linear polarizer 62 is positioned at a positive 45 degrees with respect to the fast axis of the quarter wave plate 58 in order to achieve full left hand circular polarization. For completeness, the slow axis of the quarter wave plate 60 is also depicted.

Referring again to FIG. 5, when the light, which is created by the combination of light source 20 and first circular polarizer 42, is reflected from the label 12 in the absence of invisible indicia 14 its polarization changes to right hand circular. Such right hand circularly polarized light propagating toward the image sensor 22 of the camera 18 will first pass the quarter wave plate 56 of the second circular polarizing filter 44 where it will be transformed from right hand circular to linear with the axis of polarization at a negative 45 degrees to the fast axis of the quarter wave plate 56. This light will be blocked by the linear polarizing filter 54 of the second circular polarizing filter 44, which has its axis oriented at a positive 45 degrees with respect to the fast axis of the quarter wave plate 56. Therefore, the label 12 will appear dark under this type of imaging modality. If invisible indicia are present on label 12, they will change the polarization direction of the reflected light. This will lead to an incomplete blocking of the reflected light by the second polarizer. Therefore, the invisible indicia will appear bright against a dark background in the imager of the camera 18. The linear polarizing filter 54 of the second circular polarizing filter 44 could also be oriented at an angle of 90 degrees with respect to the linear polarizing filter 54 of the first circular polarizing filter 42, i.e. at a negative 45 degrees with respect to the fast axis of the quarter wave plate 56. In the latter case, the invisible indicia will appear dark against a bright background in the imager of camera 18.

Certain light sources such as lasers emit polarized light and may replace light source 20 and first polarizer 24 in an alternate embodiment.

The invention has been described in detail with particular reference to certain preferred embodiments thereof, but it will be understood that variations and modifications can be effected within the scope of the invention.

PARTS LIST

12 label
14 invisible indicia
16 incident light
17 reflected light
18 digital camera (smart phone)
20 light source
22 image sensor
24 first polarizing filter having a first orientation
26 second polarizing having a second orientation
32 first linear polarizing filter having a first orientation
34 second linear polarizing having a second orientation
42 first circular polarizing filter
44 second circular polarizing filter
54 linear polarizing filter component of the circular polarizing filter
56 quarter wave plate component of the circular polarizing filter
58 fast axis of quarter wave plate
60 slow axis of quarter wave plate
62 polarization axis of linear polarizing filter
72 network
74 remote server
76 coupon
78 display

The invention claimed is:

1. A method of authenticating an object comprising:
providing a label with invisible indicia on the object wherein at least a portion of the label rotates a polarization of incident light;
providing a digital camera having a light source, an image sensor, a first linear polarizer having a first orientation, and a second linear polarizer having a second orientation;
illuminating the label with light from the light source through the first linear polarizer;
forming an image with the image sensor using reflected light from the label wherein the reflected light passes through the second polarizer prior to reaching the sensor;
wherein the second linear polarizer makes the invisible indicia visible; and
authenticating the object.

2. The method of claim 1 wherein the second linear polarizer is orthogonal to the first orientation.

3. The method of claim 1 further comprising:
displaying, communicating, or printing the visible indicia.

4. The method of claim 1 wherein the indicia are machine readable or human readable.

5. The method of claim 1 wherein the indicia encode authentication information.

6. The method of claim 5 further comprising:
comparing the authentication information to a predetermined authentication code.

7. The method of claim 6 wherein the comparison is made by a user or a processor in the camera.

8. The method of claim 1 further comprising:
transmitting the visible indicia to a remote location for authentication; and
transmitting the authentication to the digital camera.

9. The method of claim 8 further comprising:
transmitting a coupon to the digital camera after authentication.

10. The method of claim 8 further comprising:
collecting information related to a sale of the object.

11. The method of claim 8 further comprising:
restocking the object based on a sale of the object.

12. The method of claim 8 further comprising:
transmitting a coupon to a cash register on completion of a sale of the object.

13. The method of claim 1 further comprising:

transmitting the visible indicia and a GPS location of the digital camera to a remote location for authentication;

authenticating the object based on the visible indicia and the GPS location; and transmitting the authentication to the digital camera.

14. The method of claim 13 further comprising:

transmitting a coupon to the digital camera after authentication.

15. The method of claim 1 wherein the invisible indicia rotate a polarization of incident light differently from the surrounding label.

16. The method of claim 1 wherein the invisible indicia rotate the incident light greater than 0° and less than 180° and rotate the incident light differently from the surrounding label.

17. The method of claim 1 wherein the invisible indicia rotate a polarization of incident light.

18. The method of claim 1 wherein the label surrounding the invisible indicia rotate a polarization of incident light.

19. The method of claim 1 wherein the second orientation is parallel to the first orientation;

a first quarter-wave plate is positioned between the first linear polarizer and the label; and a second quarter wave plate is positioned between the second linear polarizer and the label.

20. The method of claim 19 wherein the invisible indicia change a polarization of incident light.

21. The method of claim 19 wherein the label surrounding the invisible indicia change a polarization of incident light.

22. A method of authenticating an object comprising:

providing a light source;

providing an image sensor;

providing a first linear polarizer having a first orientation providing a second linear polarizer having a second orientation;

illuminating a label on the object with light from the light source through the first linear polarizer;

wherein the label has invisible indicia which rotate a polarization of incident light;

forming an image with the image sensor using reflected light from the label wherein the reflected light passes through the second polarizer prior to reaching the sensor;

wherein the second linear polarizer makes the invisible indicia visible; and authenticating the object.

23. A method of authenticating an object comprising:

illuminating a label on the object with light having a first linear polarization;

wherein the label has invisible indicia which rotate the first polarization of incident light to a second polarization;

passing the light from the label through a linear polarizer which passes light having the second linear polarization and makes the invisible indicia visible;

forming an image of the visible indicia; and authenticating the object.

24. The method of claim 1 wherein the second orientation is 90° with respect to the first orientation;

a first quarter-wave plate is positioned between the first linear polarizer and the label; and a second quarter wave plate is positioned between the second linear polarizer and the label.

25. The method of claim 24 wherein the invisible indicia change a polarization of incident light.

26. The method of claim 24 wherein the label surrounding the invisible indicia change a polarization of incident light.

* * * * *